Oct. 12, 1954  M. MEARNS  2,691,284
MINIATURE DUSTPAN
Filed Sept. 23, 1949  2 Sheets-Sheet 1
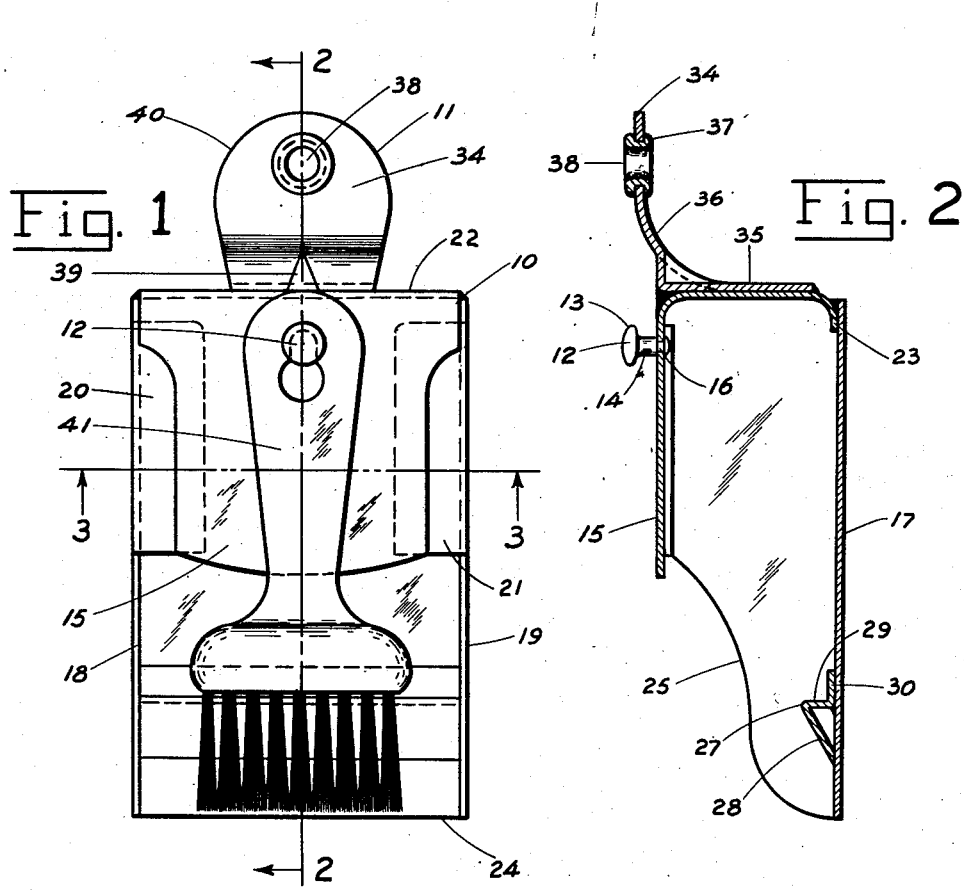
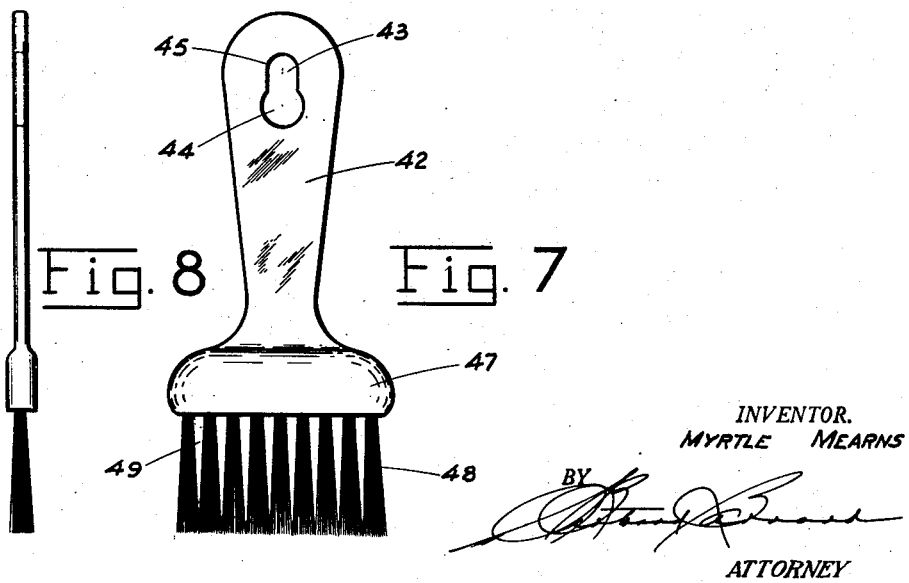
INVENTOR.
MYRTLE MEARNS
BY
ATTORNEY Oct. 12, 1954 M. MEARNS 2,691,284
MINIATURE DUSTPAN
Filed Sept. 23, 1949 2 Sheets-Sheet 2
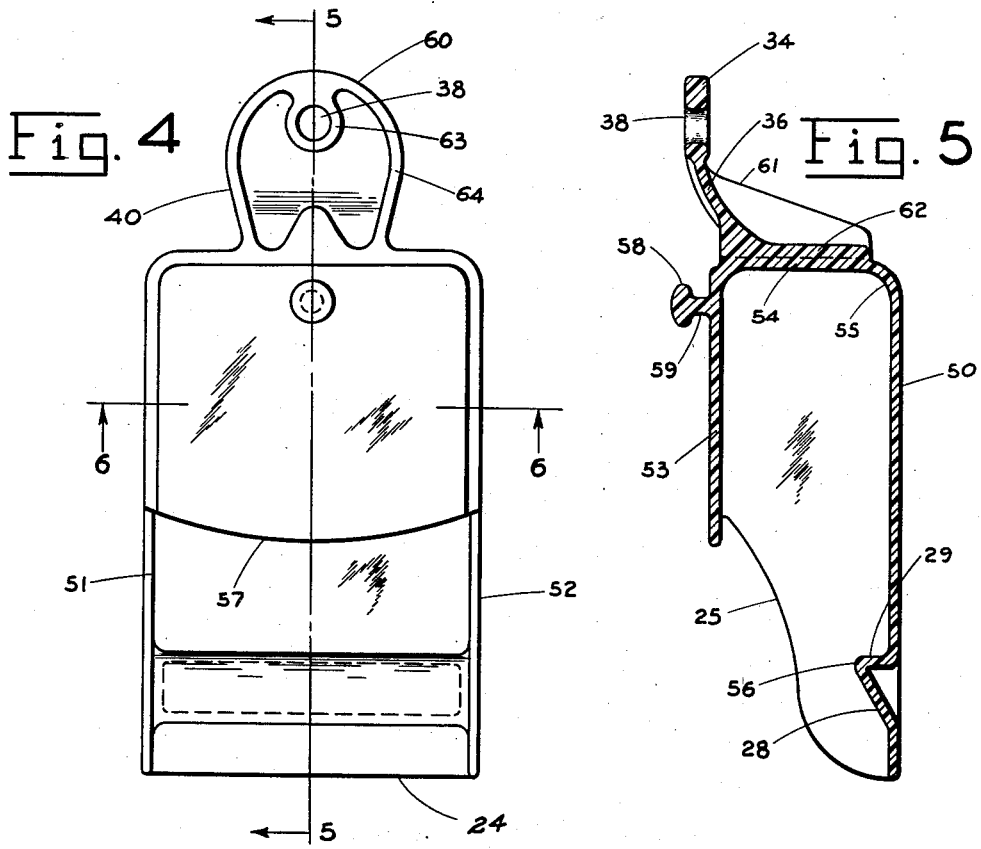
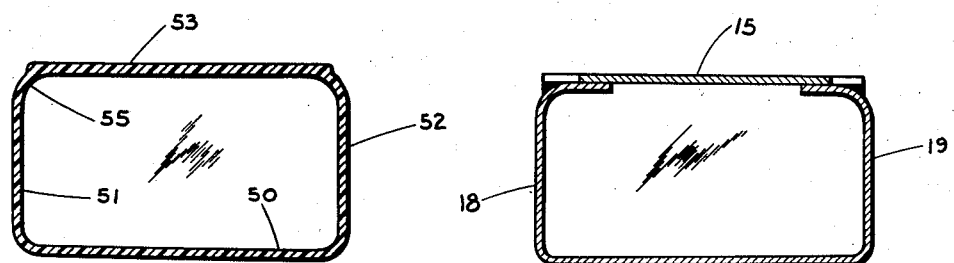
INVENTOR.
MYRTLE MEARNS
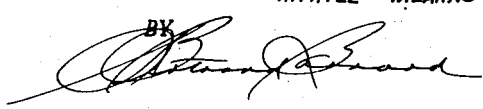
ATTORNEY Patented Oct. 12, 1954

2,691,284

UNITED STATES PATENT OFFICE 2,691,284

MINIATURE DUSTPAN

Myrtle Mearns, Brooklyn, N. Y.

Application September 23, 1949, Serial No. 117,291

3 Claims. (Cl. 65—20)

My present invention relates to a small dust pan, which is designed for use in places which are generally inaccessible to the conventional type of dust pan and the brushes used in conjunction therewith.

In the ordinary household, there are a number of places, in which dust gathers, which are extremely difficult or almost impossible to reach with the conventional type of dust pan, due to the limited space available, and particularly the narrow widths and irregular forms of the areas to be cleaned.

These spaces include window sills in which screens are permanently attached to the window frames, book cases, closets in which chinaware and other small objects are stored, mantels around bric-a-brac, vases and similar articles, in narrow spaces and in corners generally, and on card tables, and similar tables on which ashes, crumbs or dust accummulate.

While the size of the dust pan may vary to suit particular requirements, it has been found that a dust pan of approximately the size shown in the accompanying drawings, or approximately 2½ inches wide, by 1¼ inches high, and about 3¾ inches long can be utilized in a large number of places, for which the conventional dust pan is not suitable.

The object of my invention is to produce a dust pan and brush which are small, compact and can be utilized in narrow spaces and corners, which the conventional dust pan will not reach.

The further object is to produce a dust pan, which is rugged, can be easily maneuvered in narrow spaces, and will retain the dust, ashes or other material deposited in it, in various angular positions.

A further object is to produce a dust pan and brush, in which the dust pan can be hung on a hook, nail or other convenient mounting, with the brush mounted on the dust pan, so that both will be readily available, when required.

A primary object is to produce a dust pan and brush, which are light, compact, and can be produced economically, of relatively low cost materials.

The accompanying drawings, illustrative of several embodiments of my invention, together with the description of their construction and the method of operation thereof, will serve to clarify further objects and advantages of the invention.

In the drawings:

Fig. 1 represents a front elevation of one embodiment of the dust pan, made of sheet material, with the brush mounted on the projecting stud attached to the forward face of the dust pan.

Fig. 2 is a vertical section of the dust pan, taken at 2—2, Fig. 1, showing the method of forming and attaching the various elements of the dust pan body and holder construction.

Fig. 3 is a cross-section thru the body of the dust pan, of Figs. 1 and 2 taken at 3—3, Fig. 1.

Fig. 4 is a front elevation of another embodiment of the dust pan, molded in one piece of a plastic material.

Fig. 5 is a vertical section thru the molded dust pan, taken at 5—5, Fig. 4.

Fig. 6 is a cross-section thru the body of the molded dust pan, taken at 6—6, Fig. 4.

Fig. 7 represents a front elevation of the brush, used in conjunction with the dust pan, as shown in Fig. 1.

Fig. 8 is a side elevation of the brush of Fig. 7.

One embodiment of the dust pan as indicated in Figs. 1, 2 and 3, comprises a body 10, of substantially rectangular cross-section, formed of sheet aluminum alloy, or a similar material, with a holder 11, attached to the rear wall of the body.

A stud 12, the head 13 of which, is of larger diameter than that of the substantially cylindrical neck 14, may be attached to the upper wall 15 of the body by riveting the reduced diameter section 16, at the bottom of the stud over the material of the top of the body.

The sheet metal body of the dust pan, shown in Fig. 1, which may be formed of two or more pieces of sheet aluminum alloy, or a similar material, comprises a bottom 17, the sides of which are bent upward to form the side walls 18 and 19, substantially perpendicular to the bottom, the upper end of the side walls being bent inward to form the two flanges 20 and 21, substantially parallel to the bottom, to which the upper wall 15 may be attached by welding, spot welding, or by other suitable means.

The upper section of the body, formed of sheet material, the thickness of which is substantially equal to that of the bottom, comprises an upper wall 15, the rear end of which is bent downward, substantially perpendicularly to the top, to form the rear wall 22 of the body, the lower end of said rear wall being folded over to form the lower flange 23, substantially parallel to the upper wall, the lower flange being attached to the bottom 17 of the body by welding, spot welding or by other suitable means to form the completed body.

While the rear portion of the body, of substantially rectangular cross-section, as indicated in Fig. 3, is enclosed, the forward end is open at the top, the side walls 18 and 19 being gradually reduced in height from the forward end of the flanges 20 and 21 to the open end 24 of the bottom, in the form of a curve 25, a straight line sloping from the top to the bottom, or any other suitable contour, depending upon the requirements of a particular application, and the outward appearance of the assembled unit, which is desired.

A ramp or cross-member 27, consisting of a sloping forward wall 28, formed of sheet material, and a rear wall 29, formed integral therewith, and substantially perpendicular to the bottom, the ramp extending over the entire width of the body between the inner surface of the side walls 18 and 19, may be attached to the bottom of the body by welding, brazing, spot welding or other means known to the art. The two ends of the ramp walls, 28 and 29 may be similarly welded or brazed to the side walls 18 and 19 of the body to reinforce the side walls, and stiffen the body structure in general.

To facilitate welding the rear wall of the ramp to the bottom, a flange 30 perpendicular to the rear wall of the ramp may be formed at the lower end of the rear wall, this flange being spot welded, brazed, or otherwise attached to the bottom.

While a similar flange may be formed at the lower end of the sloping forward wall 28 of the cross-member 27, this flange has been omitted in the embodiment shown in Fig. 2, in order that the dust, ashes or similar material brushed into the body of the dust pan may have an unobstructed path across the bottom.

The substantially vertical rear wall 29 of the cross-member serves to retain any dust or similar accumulation, which may be deposited in the covered rear section of the body. This is of particular importance when the pan is utilized in narrow areas, where it can only be inserted with the rear portion of the bottom sloped upward, at an angle, or in removing the pan from such areas, in which the accumulated dust or ashes would tend to slide out of the dust pan, unless such a wall or baffle were available.

The holder 11 which may be attached to the rear wall 22 of the body, may also be formed of sheet material, of a thickness equal to or slightly greater than that of the body, is formed with a substantially flat upper section 34 which is formed integral with the lower or mounting section 35, and connected thereto by a curved area having a fairly large corner radius 36.

The upper end of the substantially flat mounting section of the holder may have a substantially circular opening formed therein, a grommet 37 being fitted to said opening and attached to the faces of the holder, as indicated in Fig. 2, with a smaller circular opening 38, formed at the center of the grommet. In place of the grommet the material of the holder may be flanged outward to form a reinforcement around the opening 38.

A reinforcing or channel rib 39 may be formed in the lower section of the curved portion of the holder to stiffen the holder as indicated in Figs. 1 and 2. The sides 40 of the upper end of the holder may be rounded or of any other suitable form to suit a particular application and to provide a pleasing contour.

In another embodiment of the dust-pan shown in Figs. 4, 5 and 6, the entire unit is molded in one piece of a thermo-plastic material, or die-cast of an aluminum alloy or other suitable composition.

The size and form of the pan are substantially the same as the one shown in Figs. 1 and 2, and hereinbefore described.

The cross-section thru the closed rear portion of the pan may also be substantially rectangular, as indicated in Fig. 6.

The bottom 50, the side walls 51 and 52, the upper wall 53, and the rear wall 54, may be molded, or die-cast in one piece, with fillets 55 formed at the junctions between the inner edges of the walls.

The ramp 56, located behind the forward end of the bottom wall of the pan, is molded integrally with the bottom wall, the sloping forward wall 28, and the vertical rear wall 29, blending into the bottom and side walls of the pan, with fillets 55, formed between the ramp walls, and the side and bottom walls of the dust-pan.

The forward edge 57 of the upper wall of the body is located beyond the center line of the body, the contour of the edge being arcuate in form. The rear section of the body is thus completely covered in the same manner as that shown in Figs. 1 and 2, with the forward section open at the top.

The forward portion of the side walls 51 and 52, is sloped downward from the point at which the top intersects the side walls, the upper edge of the side walls forming a curve 25, or a sloping line extending downward toward the open end 24 of the bottom.

A stud comprising a head 58, and a reduced diameter neck 59, may be molded integral with the upper wall of the body, the form and diameter of the head and neck being substantially the same as that of the stud shown in Fig. 2.

The holder 60, the contour of which is substantially the same as that shown in Figs. 1 and 2, may be molded integral with the rear wall of the pan body. A reinforcing rib 61 may be formed between the upper section 34, of the holder, and the flange 62, formed integral with the rear wall.

An opening 38 may be formed in the outer end of the upper section of the holder, a substantially circular reinforcing rim 63 being formed around the opening. The sides 40 of the upper edge may be rounded in the same manner as those shown in Fig. 1, a reinforcing band 64 being formed around the entire outer contour of the upper section, with the interior area of the upper section reduced in thickness.

The functioning of the molded dust pan and the method of supporting the brush, are substantially the same as that shown in Figs. 1 and 2 and previously described.

The dimensions of the dust pan and brush, shown in Figs. 1 and 4 may be varied considerably to suit the requirements of a particular application, the bottom of the pan being made narrower or wider depending upon the location in which it is to be used.

The cross-section of the closed rear portion of the body, while rectangular in Figs. 3 and 6 may be varied considerably to suit particular applications. Where the dust pan is to be used in locations, which are shallow, the height may be reduced.

The form and contour of the body may be altered considerably, either for aesthetic reasons, or to suit particular applications.

The length of the body may be increased to a certain extent, with relation to the width, where increased capacity is required, or to suit the requirements of a particular application.

The mounting section of the holder may be located in substantial alignment with the bottom wall of the dust pan body, where it is found more convenient to hang the assembled unit, in which case some other means of gripipng the holder would be provided at or near the upper wall.

The method of forming the top, sides, and rear wall of the sheet metal body may be altered considerably to suit manufacturing requirements, and various types of combinations of integral walls and flanges may be used in place of the one shown in Figs. 1 and 2.

The one-piece unit shown in Figs. 4 and 5 may be molded of a plastic material, or die cast of an aluminum alloy or other suitable material, depending upon maufacturing requirements, appearance and other factors.

Where the dust pan is molded or die cast, the entire unit may be molded in one piece, or the holder may be molded separately and attached to the body by riveting, gluing, soldering or other suitable method, depending upon the material used and manufacturing considerations.

It will, accordingly, be appreciated that the miniature dust pan and brush combination herein described, has new and useful constructional and operational features offering distinct advantages over existing types of dust pans. It will, moreover, be understood that the foregoing description of the various embodiments and modifications of the construction is illustrative, and that numerous changes can be made therein, without departing from the essentials of the invention which is, rather, defined by the appended claims.

What I claim as new, and desire to cover by Letters Patent, is:

1. A minitature dust pan molded of a plastic material, comprising a body of substantially rectangular vertical cross-section, the forward end of the upper portion of the body being cut away, a holder integral with one wall of said body, and a ramp, the walls of said ramp being integral with the bottom of said body, adjacent the forward edge thereof, the forward wall of said ramp sloping upward from the bottom toward the rear, the rear wall of said ramp being substantially perpendicular to the bottom to retain the material deposited in the rear of the pan.

2. A dust pan vertically of substantially rectangular cross-section made of a plastic material, comprising a bottom and side walls, with an upper wall extending over the rear section of the side walls, the upper portion of the forward section being uncovered, the joints between said walls of the pan being closed, to retain any material deposited in the pan, a handle integral with one wall of said pan, said handle having an opening therein to support the pan, and a ramp, the walls of said ramp being integral with the bottom of the pan, said ramp extending the entire width of the bottom between the side walls, the forward wall of said ramp sloping upward from the bottom toward the rear, the rear wall of the ramp, formed integral with said forward wall, being substantially perpendicular to the bottom of the pan to retain the material deposited in the dust pan.

3. A miniature dust pan molded of a plastic material, comprising a substantially flat bottom, side walls and a rear wall formed integral with said bottom, a top extending over a portion of the bottom, formed integral with said side and rear walls, a handle formed integral with one of the walls of said pan, said handle having an opening formed therein for supporting the pan, and a ramp, the walls of said ramp being formed integral with the bottom and side walls, the forward wall of said ramp sloping upward from the bottom toward the rear, the rear wall of said ramp retaining the material deposited in the pan.

References Cited in the file of this patent

UNITED STATES PATENTS

| Number | Name | Date |
|---|---|---|
| 92,754 | Schanck | July 20, 1869 |
| 219,875 | Richmond | Sept. 23, 1879 |
| 448,667 | Oram | Mar. 24, 1891 |
| 587,607 | Ray | Aug. 3, 1897 |
| 657,243 | Leib | Sept. 4, 1900 |
| 675,052 | Carlson | May 28, 1901 |
| 717,639 | Tichenor | Jan. 6, 1903 |
| 737,688 | Wheeler | Sept. 1, 1903 |
| 805,904 | Despain | Nov. 28, 1905 |
| 865,643 | Jackson | Sept. 10, 1907 |
| 944,490 | Lotze | Dec. 28, 1909 |
| 1,118,759 | Glotfelty | Nov. 24, 1914 |
| 1,270,340 | Spaulding | June 25, 1918 |
| 1,315,310 | Kelley | Sept. 9, 1919 |
| 1,349,582 | Peterson | Aug. 17, 1920 |
| 1,579,279 | Cave | Apr. 6, 1926 |
| 1,908,730 | Caldwell et al. | May 16, 1933 |
| 2,255,715 | Samms | Sept. 9, 1941 |
| 2,433,325 | Slaughter | Dec. 23, 1947 |
| 2,455,695 | Monaco | Dec. 7, 1948 |
| 2,477,876 | Jaffa | Aug. 2, 1949 |